United States Patent [19]
Simone

[11] Patent Number: 5,181,370
[45] Date of Patent: Jan. 26, 1993

[54] CUTTING DECK-MOUNTED AUXILIARY OPERATOR CONTROL HANDLE TRANSFORMER UNIT AND METHOD FOR CONVERTING WALK BEHIND MID-SIZE ROTARY MOWER INTO RIDING MOWER

[76] Inventor: Nicholas Simone, 2225 Highway A1A, Unit 604, Indian Harbour Beach, Fla. 32937

[21] Appl. No.: 680,926

[22] Filed: Apr. 5, 1991

[51] Int. Cl.⁵ .............................................. A01D 34/64
[52] U.S. Cl. .............................. 56/14.7; 56/DIG. 22
[58] Field of Search ................. 56/2, 14.7, 14.5, 15.6, 56/320.1, DIG. 18, DIG. 22; 180/6.24, 6.32, 11, 21, 900

[56] References Cited

U.S. PATENT DOCUMENTS

| 4,263,977 | 4/1981 | Willett | 56/DIG. 22 X |
| 4,516,967 | 5/1985 | Scanland et al. | 56/14.7 |
| 4,914,894 | 4/1990 | Geiger | 56/14.7 |

OTHER PUBLICATIONS

McDonough Power Equipment Inc. brochure, Aug. 1956.

*Primary Examiner*—David J. Bagnell
*Attorney, Agent, or Firm*—Evenson, Wands, Edwards, Lenahan & McKeown

[57] ABSTRACT

A transformer unit mountable above the cutting deck of a mid-size, walk behind rotary mower, converts the mower into a riding mower. The transformer unit allows an operator to sit above the cutting deck and use the original operator control handle, which is relocated to the front end of the mower. The transformer unit comprises a support frame affixed to a cutting deck support structure. The support frame includes a vertically tiltable floor unit that extends over the top of cutting deck. An auxiliary operator control handle attachment fixture is mounted to the forward end of the support frame adjacent to the front end of the mower. A set of auxiliary control links is retained by the support frame for reconnecting control elements of the repositioned operator control handle with mower drive and steering components. An operator seat fixture is mounted to a rear end of the tiltable floor unit of the support frame. An operator sits atop the mower directly behind the repositioned operator control handle and controls the mower from a seated driving position.

27 Claims, 8 Drawing Sheets

CUTTING DECK-MOUNTED AUXILIARY OPERATOR CONTROL HANDLE TRANSFORMER UNIT AND METHOD FOR CONVERTING WALK BEHIND MID-SIZE ROTARY MOWER INTO RIDING MOWER

FIELD OF THE INVENTION

The present invention relates in general to walk behind rotary mowers and is particularly directed to a transformer unit that is mountable above the cutting deck of a mid-size walk behind rotary mower and effectively converts the mower to a riding mower, so that an operator seated atop the cutting deck of the converted mower is able to comfortably control the mower using the original control handle, which has been repositioned by the transformer unit to the front end of the mower.

BACKGROUND OF THE INVENTION

Lawn and landscaping services customarily employ a diversity of cutting and trimming equipment in order to accommodate the demands of the job site and to attain a high level of productivity. To handle the most common task of cutting ground cover, a commercial service maintain an inventory of multiple sized rotary mowers and will typically operate the largest sized mower that can be practically used for the job. Although maximum coverage is obtained by the use of large capacity riding mowers, they cannot be used in all applications. This fact, coupled with the substantial cost of such equipment, has led many commercial services to rely heavily on the use of mid-size, walk behind rotary mowers. Mid-size walk-behind mowers are popular among commercial cutters because they have the maneuverability of a standard twenty-one inch walk-behind mower when working in tight areas, and the power and cutting capacity of a lawn tractor for large areas.

Yet, because mid-size mowers are fairly heavy and cumbersome pieces of equipment, they are often coupled with a rear-end riding attachment, commonly referred to the industry as a sulky—a two-wheeled seat and foot rest device, that allows the operator to be reasonably comfortably seated during prolonged operation of the mower. Now, although a sulky helps reduce operator fatigue, it effectively increases the wheelbase of the mower and requires the operator to take the position of the sulky into consideration in the course of guiding the mower. This problem is especially noticeable when attempting to maneuver the mower around tight curves (e.g. trees) and requires particular caution when backing up the mower. Moreover, as mower manufacturers have now offer enlarged cutting deck options for mid-sized product lines, an increased burden is placed upon a walk behind or ride behind operator.

SUMMARY OF THE INVENTION

In accordance with the present invention, the above discussed problems of a conventional mid-sized, walk behind, rotary mower are obviated in accordance with the present invention by means of a transformer unit that is mountable above the cutting deck and is configured so as to effectively convert such a mower into a riding mower, such that it allows an operator to be seated above the cutting deck, while still being able to comfortably control the mower by means of the original control handle, which is relocated by the transformer unit to the front end of the mower.

The mid-sized mower with which the present invention may be used may be any of a variety of commercially available mid-size, walk behind mowers of conventional construction. As normally understood in the trade, a mid-size, walk-behind, rotary mower may have a cutting deck diameter in a range of from 32 to 62 inches. Typically, such a mower has a front end supported by way of a first pair of pivotable wheels and a rear end supported by a second pair of larger, drive wheels. The drive wheels are coupled by means of a transmission unit to a motor mounted at the rear end of the mower. A rotary blade cutting deck is supported (e.g. by means of a 'floating' attachment) between the front and rear ends of the mower, and one or more rotary blades, mounted for rotation beneath the cutting deck, are coupled via rotary blade drive linkage to the motor unit. Operation of a mid-size mower is controlled by an operator control handle, which is attached to a fixture at the rear end of the mower such that the control handle normally extends rearwardly of the mower, so that operation of the mower is controlled from the rear, by an operator who either walks behind the mower or is seated on a sulky attached to the rear of the mower.

In order to enable an operator to control the operation of a mid-size mower from atop its cutting deck, the transformer unit according to the present invention comprises a handle fixture and operator seat retaining support frame which is affixed to a cutting deck support structure, such as a pair of rails along opposite sides of the cutting deck. The support frame includes a vertically tiltable floor unit that extends over the top of cutting deck. An auxiliary operator control handle attachment fixture is mounted to the forward end of the floor unit of the support frame adjacent to the front end of the mower and is configured to engage and support the (normally rear end attached) operator control handle, such that the control handle extends above the cutting deck adjacent to a position where the operator is to be seated. An set of auxiliary control linkages is retained by the support frame for reconnecting control elements of the repositioned operator control handle with mower drive and steering components. A operator seat fixture is mounted to a rear end of the tiltable floor unit of the support frame, so as to enable an operator to be seated atop the mower directly behind the repositioned control handle and thereby comfortably control the operation of the mower from a 'driving' position, as opposed to a walk or ride behind sulky position.

Mounting the seat fixture at a rear portion of the floor unit of the support frame permits the operator to be seated above the motor behind the cutting deck, while allowing the operator's legs to rest comfortably on the support frame atop the cutting deck. Because the floor unit is pivotally attached to the support frame, it can be tilted upwardly from the cutting deck and thereby furnish access to the cutting deck and the underside of the support frame, for maintenance. The support frame is configured of a pair of lateral channel pieces which are bolted at holes in the side rails normally provided to accommodate a clippings bag support fixture. In turn, the lateral channel pieces of the support frame are slotted to permit insertion and retention of such a bag support fixture, so that none of the functionality of the original mower is lost by the use of the transformer unit.

The operator control handle attachment fixture of the original mower ordinarily comprises a first bracket mounted to a rear end of the mower. This bracket has a first plurality of operator control handle attachment holes where the handle is attached to the bracket, and may support a pair of levers at opposite sides of the bracket which are engageable with (drive wheel rotation control) steering rods of the handle and with drive links (e.g. belts) for the wheels. The auxiliary operator control handle attachment fixture of the invention comprises a second bracket mounted to a front end of the support frame, the second bracket having a second plurality of operator control handle attachment holes where the control handle is attachable to the second bracket, the second plurality of operator control handle attachment holes being arranged on the second bracket in conformity with the mounting holes of the first bracket.

The drive unit of a conventional mid-sized mower also includes a transmission control mechanism, typically in the form of a transmission lever mounted to a bracket at the rear of the motor directly in front of the control handle, so that the operator can reach down and shift the transmission. The transformer unit of the invention further contains an auxiliary transmission control mechanism mounted to a location on the floor unit easily reached by a seated operator. As a consequence, all of the original control linkage is retained except that the control elements themselves are now repositioned on the transformer unit to be easily reached by an operator seated atop the cutting deck.

DETAILED DESCRIPTION

Figure 1:
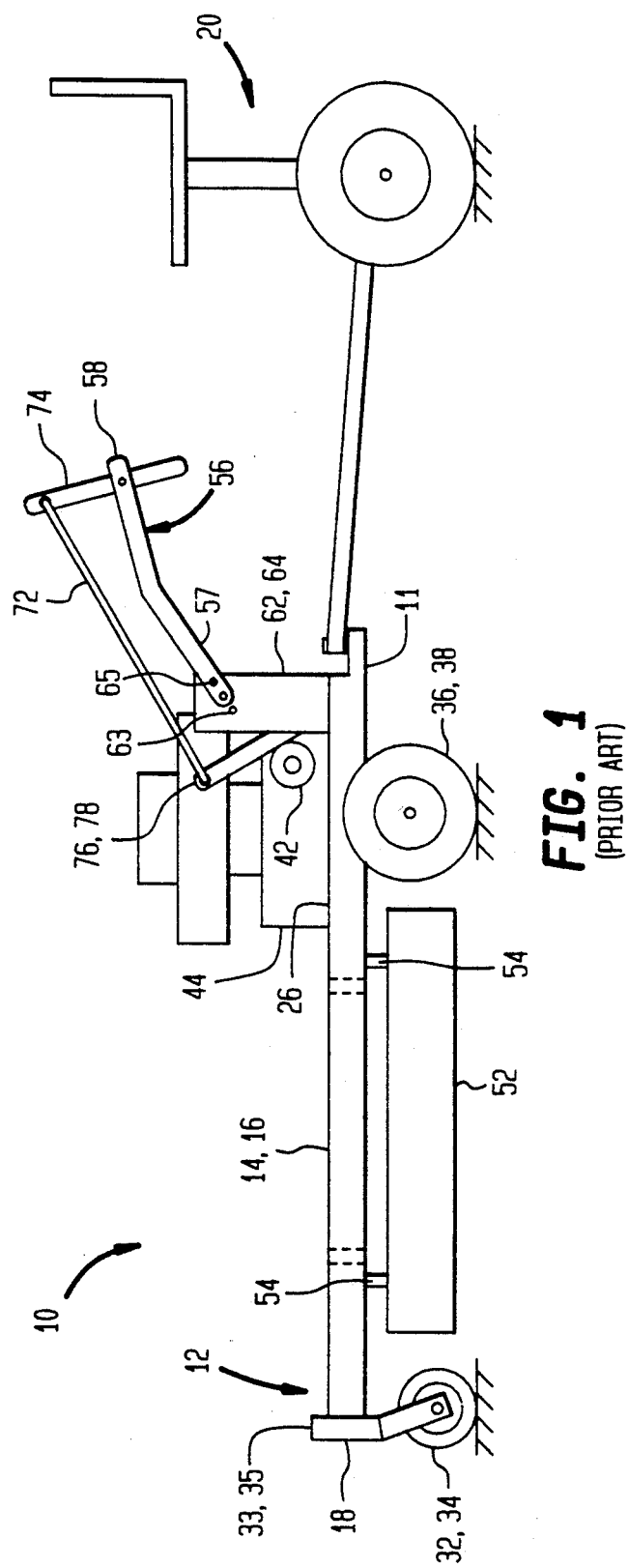
FIGS. 1 and 2 show respective side and top views of a simplified diagrammatic illustration of the basic configuration of a typical mid-sized, walk behind rotary mower.
Figure 2:
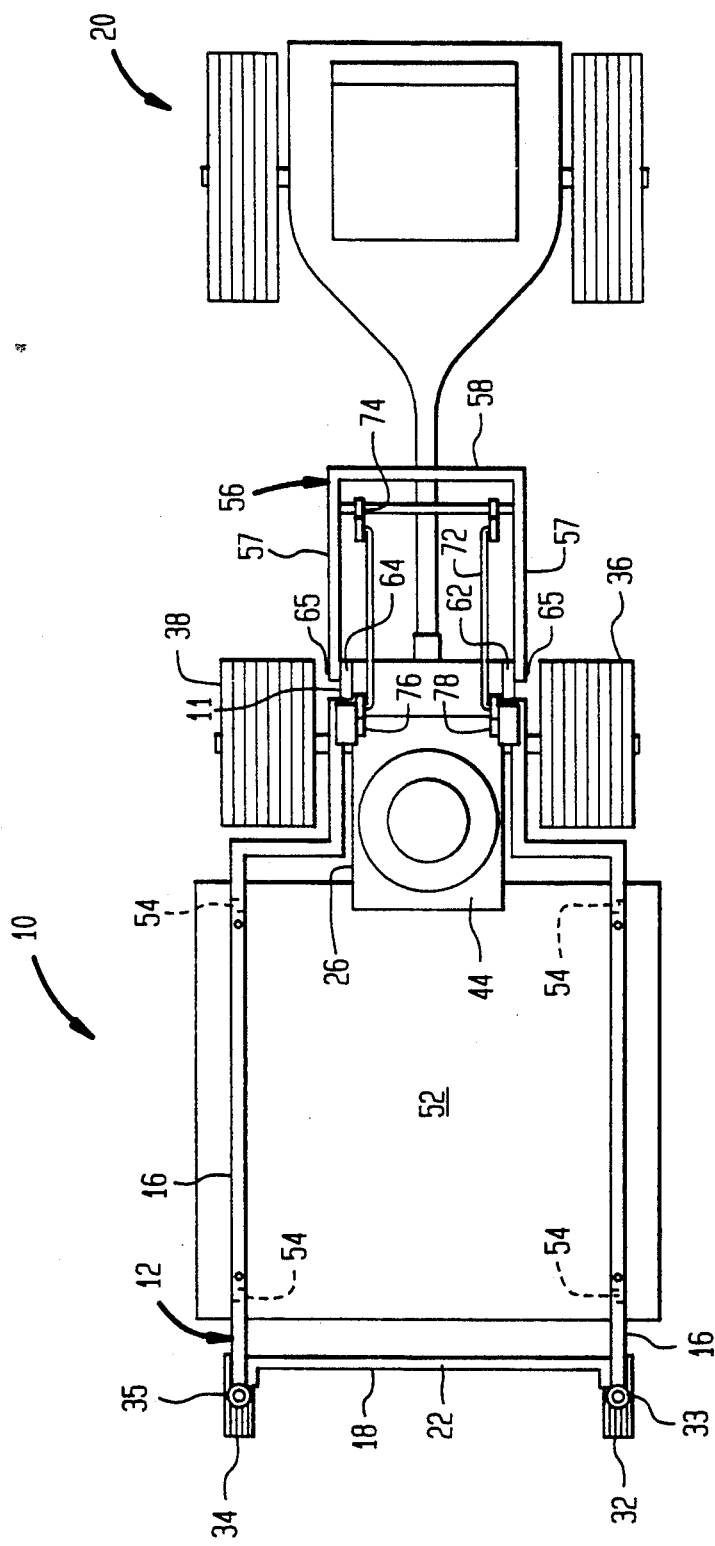

As pointed out above, the transformer unit of the present invention is designed to be used with a variety of commercially available mid-size, walk behind mowers of conventional construction, such as any of the ProLine 30000 series manufactured by the Toro Company. FIGS. 1 and 2 show, in simplified diagrammatic form, respective side and top views of the basic configuration of a typical mid-sized, walk behind rotary mower 10, together with a sulky 20 which is coupled to the rear end 11 of mower 10. The mower itself has a mainframe 12, comprised of a pair of spaced apart side rails or channels 14, 16 which are joined at the front end 18 of the mower by a cross channel 22 and at the rear end 11 of the mower to an engine frame bed 26. The mower's front end 18 is supported by way of a first pair of wheels 32 and 34, that are pivotable about respective wheel mounts, while the rear end 11 is supported by a second pair of larger, drive wheels 36 and 38. Drive wheels 36 and 38 are coupled by means of a transmission unit 42 to the output shaft of a motor 44, which is mounted to the engine frame bed 26. A rotary blade cutting deck 52 is supported by means of attachments 54 to the mainframe 12 between the front and rear ends of the mower, and contains one or more rotary blades (not shown), which are mounted for rotation beneath the cutting deck and are coupled via rotary blade drive linkage to the motor 44.

The mower is controlled by an operator control handle 56, lower ends of the legs 57 of which are mounted to a pair of vertical brackets 62, 64, attached to a rear region of the engine frame bed 26. The upper end of control handle 56 extends behind the mower, thereby permitting operation to be controlled by an operator who either walks directly behind the handle or is seated on sulky 20. Each of control handle mounting brackets 62, 64 has a plurality of attachment holes 63 where a lower end of a respective leg of the handle is attached by suitable bolt/cotter pin fasteners 65. The control handle customarily carries a pair of steering control rods 72 which engage a steering bar 74 at the upper end of the handle. Where the mower drive mechanism employs a belt control drive, control rods 72 are coupled to a pair of levers 76, 78 rotationally mounted to brackets 62, 64 adjacent to the lower end of the handle. In the case of a belt-controlled mower drive, each lever retains a respective belt roller (not shown) around which a drive wheel control belt (not shown) passes. Where the mower drive mechanism employs a hydrostatic control drive, the lower ends of the control rods are coupled to respective control elements of respective hydrostatic drive units (not shown). The control handle may also contain motor speed and/or forward/reverse controls at its upper end 58 for controlling the operation of the mower engine and the transmission unit. Alternatively, a forward/reverse control lever may be mounted to a bracket located directly behind the motor and accessible by the operator by reaching down past or through the legs of the control handle. Such control elements are typically coupled the engine and transmission by way of metallic cabling and a wiring harness.

Figure 3:
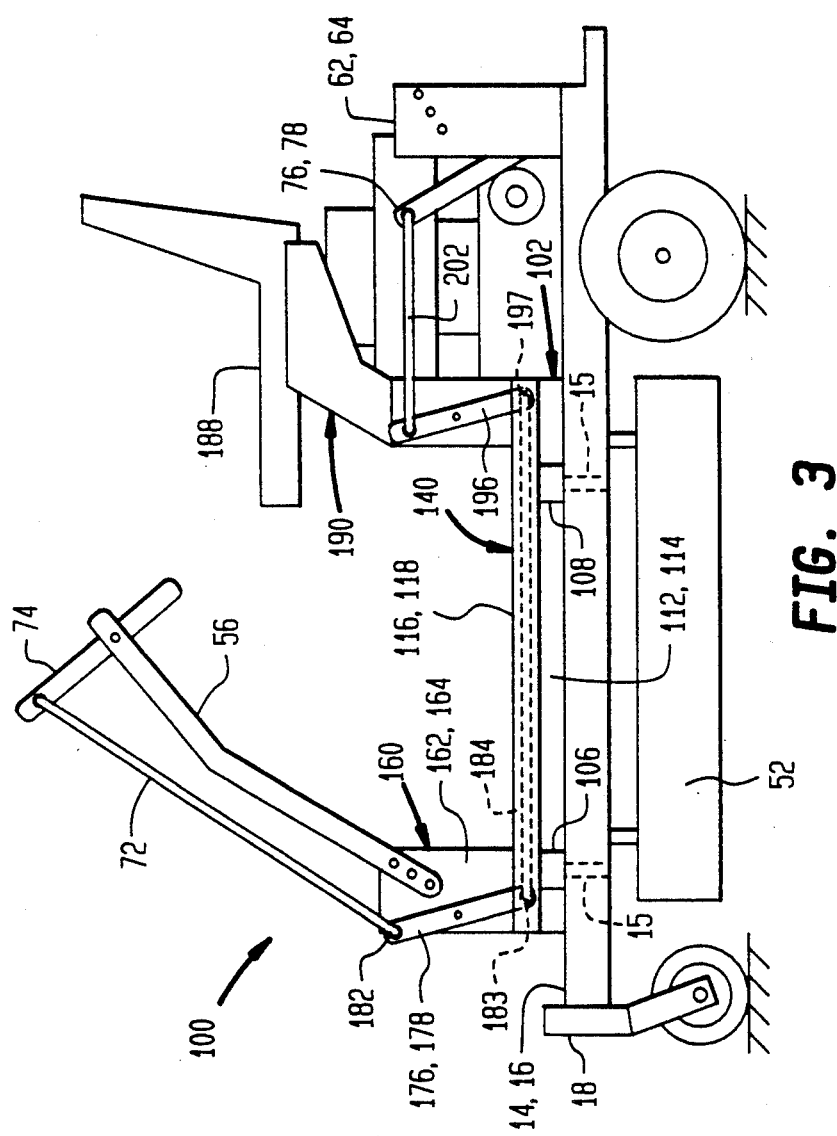
FIG. 3 is a diagrammatically side view of the manner in which the mid-sized mower of FIGS. 1 and 2 may be converted into a riding mower by attachment of an transformer unit of the present invention.

FIG. 3 diagrammatically illustrates the manner in which the mid-sized mower of FIG. 1 may be converted into a riding mower by attachment of an transformer unit 100 of the present invention, which is mountable above the cutting deck 52 and is configured so as to allow an operator to be seated above the cutting deck, while still being able to comfortably control the mower by means of the original control handle 56, which is relocated by transformer unit 100 to the front end 18 of the mower.

Figure 4:
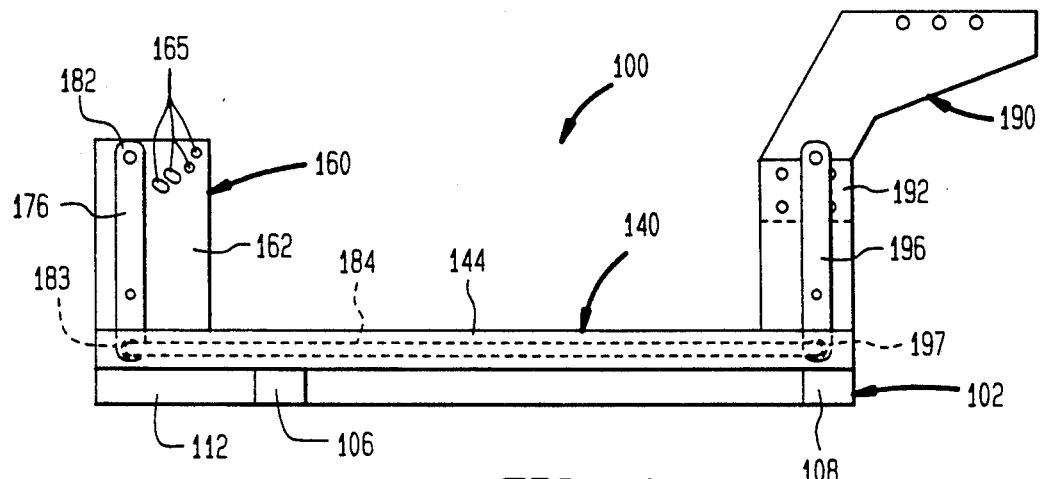
FIGS. 4 and 5 are respective left and right hand diagrammatic side views of the transformer of the present invention.
Figure 5:
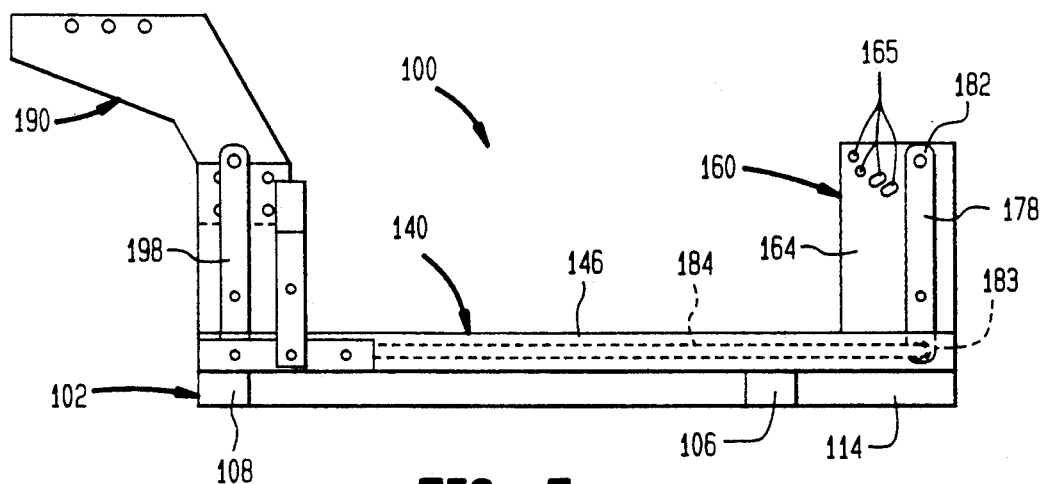
Figure 6:
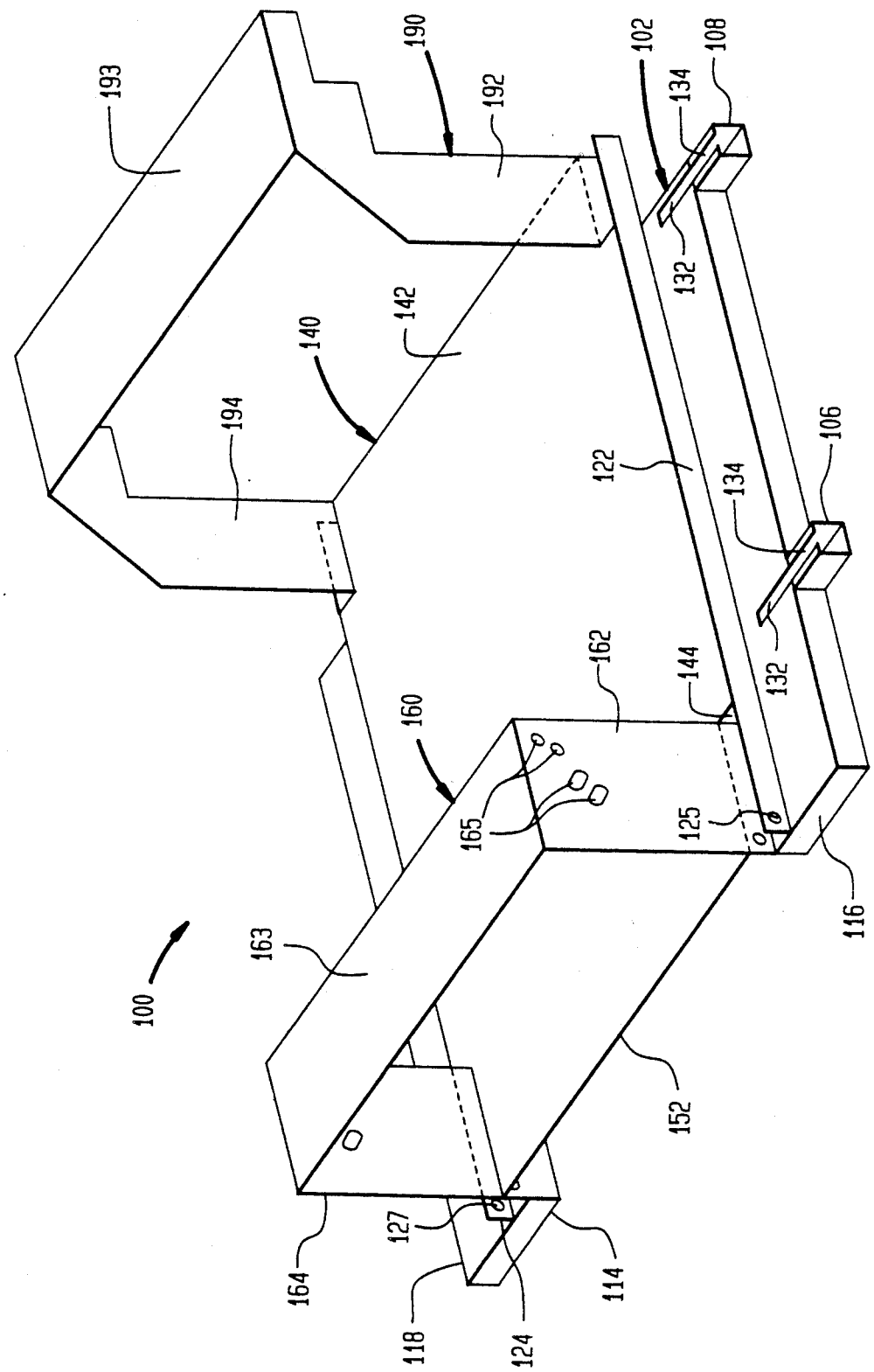
FIGS. 6 and 7 are perspective diagrammatic views showing portions of the transformer unit of the present invention.
Figure 7:
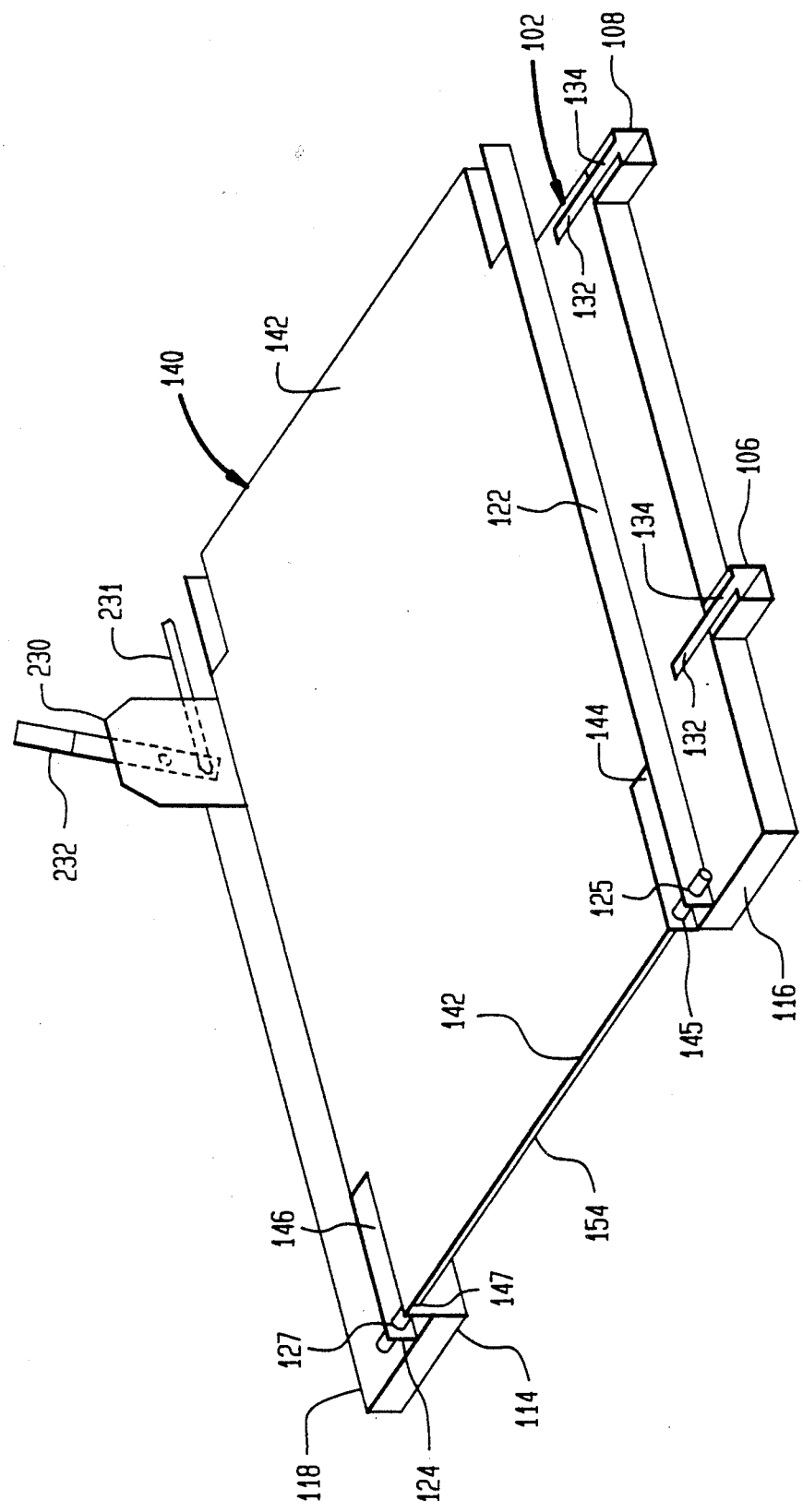

As shown in the side views of FIGS. 3, 4 and 5, and in perspective views of FIGS. 6 and 7, transformer unit 100 comprises a generally rectangular, steel support frame 102 having a first pair of spaced apart, transverse channel members 106, 108 which extend across the side rails 14, 16 of the mower. Each transverse channel member 106, 108 is sized to accommodate the insertion of a section of generally rectangular or square channel of the bag support fixture. In addition, each transverse channel member 106, 108 has holes therethrough that are aligned with the holes 15 in side rails 14, 16, so as to allow the support frame to be bolted to the side rails at locations where channels of the bag support fixture are normally boltable to the side rails.

Support frame 102 further includes a pair of spaced apart longitudinal channel members 112, 114 which are affixed welded to transverse channel members 106 108 so that they may overlie side rails 14, 16. Respective L-shaped top plates 116, 118 are welded atop longitudinal channel members 112, 114, such that a ridge portion 122, 124 of each respective plate extends vertically along an interior edge of each plate. Top plate 116 and underlying transverse channel members 104, 106 have respective slots 132, 134 to accommodate a gusset plate that may be welded to a clipping bag retention bar that is normally boltable to side rails 14, 16, as noted above.

Support frame 102 also includes a vertically tiltable floor unit 140 comprised of a floor plate 142 having a pair of longitudinal side channels 144, 146 which extend along the side edges of the floor plate 142 and are arranged to rest upon transverse channels 104, 106 when the floor unit is lowered to its horizontal position over the cutting deck. A front end 152 of floor unit 140 has a horizontally extending shaft 154, which passes through holes 145, 147 in side channels 144, 146, and corresponding holes 125, 127 in ridge portions 122, 124 of plates 116, 118 so as to be upwardly tiltable about the front end 152 of the support frame.

Figure 8:
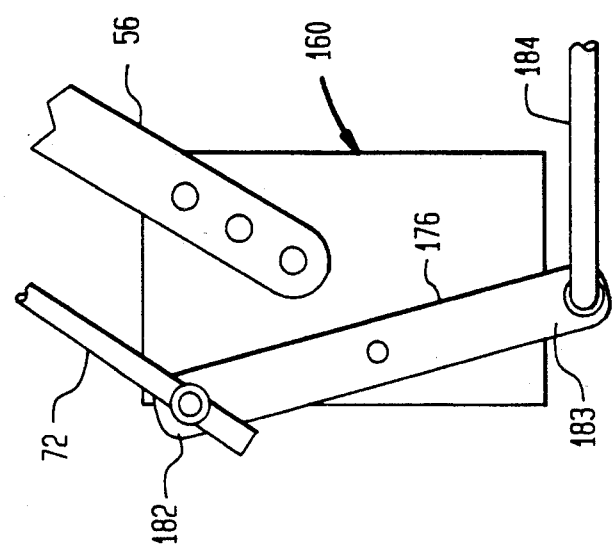
FIG. 8 is an enlarged side view of an auxiliary handle mounting bracket.

An auxiliary operator control handle attachment bracket 160, comprised of side plates 162, 164 and a top plate 163, is welded to the forward end of floor plate 142 and is configured to engage and support the lower end of (normally rear end attached) operator control handle 56, such that the control handle extends above the cutting deck adjacent to a position where the operator is to be seated, as shown in FIG. 3. For this purpose, each side plate 162, 164 of bracket 160 has a set of auxiliary attachment holes 165 where a lower end of a respective leg 57 of control handle 56 is attached by suitable bolt/cotter pin fasteners. In addition, since control handle 56 customarily carries a pair of steering control rods 72 which engage steering bar 74 at the upper end of the handle, a pair of auxiliary levers 176, 178 are rotationally mounted to side plates 162, 164 of bracket 160. As shown in enlarged detail in FIG. 8, an upper end 182 of each lever is coupled to one of the control rods 72, while a lower end 183 is coupled to one end of a respective translation rod 184 that extends through one of side channels 144, 146 of floor unit 140 to the rear end of the floor unit.

An adjustable operator seat fixture 190 is attached to the rear end of floor plate 142 and is configured such that a seat 188 mounted thereon extends over the motor 44, when the floor unit is lowered to its horizontal position of the cutting deck. Seat fixture 190 has a pair of lower sidewall plates 192, 194 which are welded to floor plate 142, and a top plate 193. Rotationally mounted to each sidewall plate is a respective lever 196, 198 a lower end 197 of which is attached to the other end of a respective translation rod 184 that extends through one of side channels 144, 146.

Figure 9:
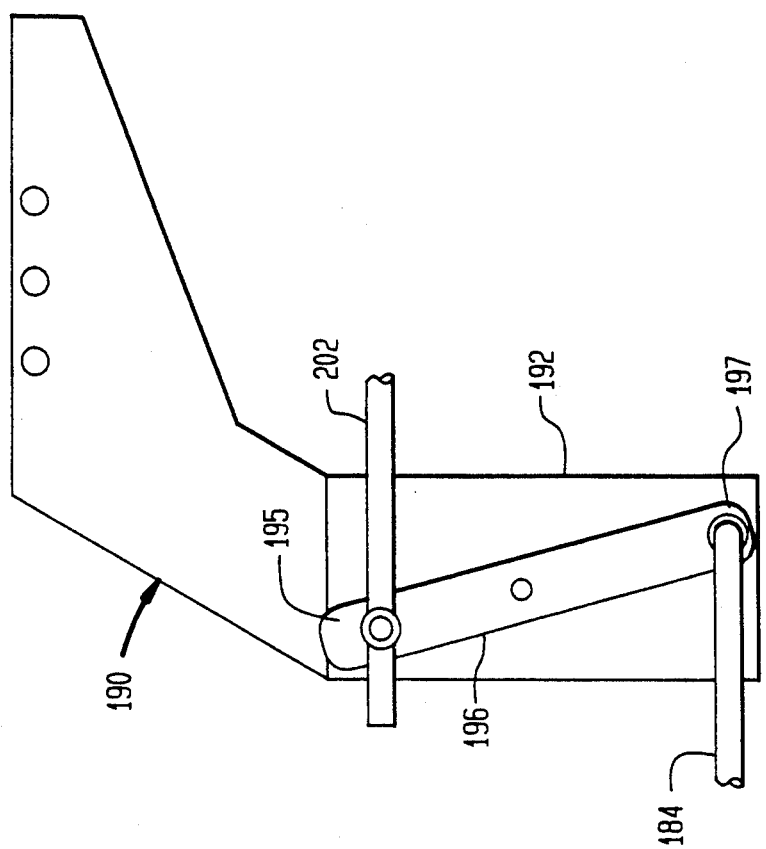
FIG. 9 is an enlarged side view of a seat fixture.

As shown in enlarged detail in FIG. 9, an upper end 195 of a respective lever (196 shown) is arranged to be coupled to one end of a respective further control rod 202, a second end of which is coupled to the upper end of a respective one of control levers 76, 78 to which rods 72 are normally connected when the operator control handle is conventionally mounted to the rear end of the mower. In effect, therefore auxiliary levers 176, 178 of auxiliary bracket 160 and additional levers 196, 198 of seat fixture 190, together with associated pairs of control rods 184 and 202, form a steering linkage translation unit, that permits repositioned control handle 56 to be manipulated by an operator seated atop the mower's cutting deck. Of course, where the mower drive mechanism employs a hydrostatic control drive, control rods 202 are coupled to respective control elements of respective hydrostatic drive units.

Figure 10:
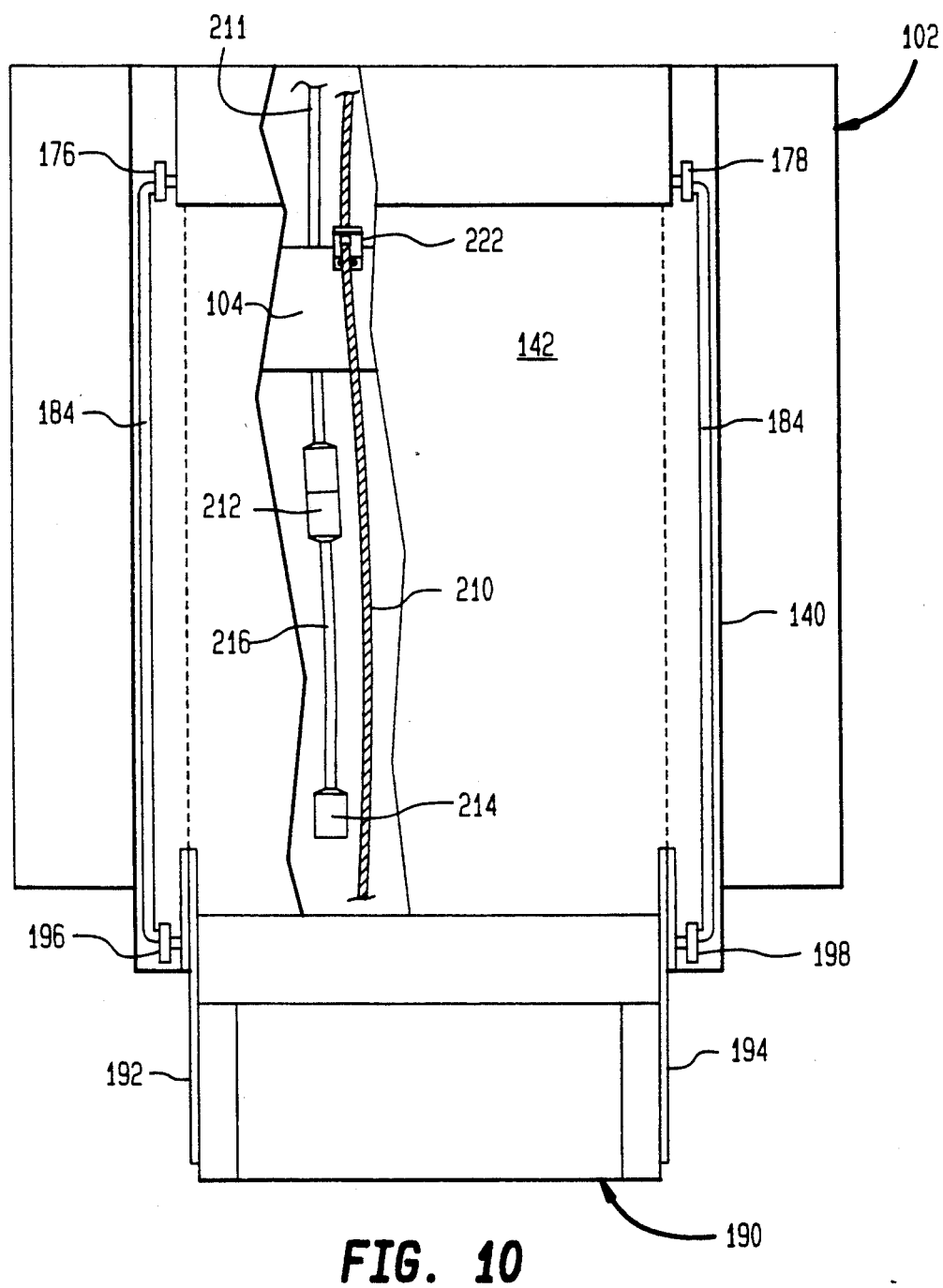
FIG. 10 is a diagrammatic top view of the transformer unit of the present invention.

As shown in FIG. 10, to provide connections between control cabling, including metallic cabling and a wiring harness feed, of the control handle and operational control components of the mower, floor unit 140 is provided with an auxiliary cabling link 210, which runs beneath floor plate 142 and is attachable at its two opposite ends to the ends of the original cabling of the control handle. To provide attachment to the original electrical wiring harness of control handle 56 and the wiring harness for the ignition unit of the motor, complementary male/female connectors 212, 214 are provided at opposite ends of an auxiliary wiring harness 216. To provide mechanical continuity with metallic cabling link 211 of the control handle, a cable connection fixture 222 is mountable to transverse channel 104 of support frame 102. Auxiliary metallic cabling link 210 runs beneath floor plate along support frame 102 and connects with the motor throttle, while auxiliary wiring harness 216 extends between wiring harnesses 211 of control handle 56 and the wiring harness of the motor ignition unit.

To accommodate manipulation of transmission control linkage normally coupled to a forward/reverse control lever bracket located directly behind the motor, an auxiliary forward/reverse lever bracket 230 may be mounted to support frame 102 alongside the base of seat fixture 190, as shown in FIG. 7. Auxiliary mechanical cabling 231 is coupled from a control lever 232 pivotally mounted to forward/reverse lever bracket runs along the support frame 102, for attachment with the mower's transmission unit.

Installation of the transformer unit of the present invention is a relatively simple task. First, electrical and mechanical links of the mower's control handle 56, including mechanical cabling, wiring harness and control rods are disconnected from the drive unit control elements to which they are attached. The control handle is then disconnected from its attachment locations of rear end brackets 62, 64. Transformer unit 100 is placed atop the cutting deck and bolted to side rails 14, 16 of the mower's main frame 12. Control handle 56 is then mounted to attachment holes 165 of auxiliary control handle bracket 160, so that it extends over the cutting deck of the mower, as shown in FIG. 3. The free ends of disconnected electrical and mechanical links of control handle 56 are then connected to the above-described auxiliary connection links (mechanical cabling, wiring harness, translation levers, additional control rods) resident within the transformer unit. The converted mower is ready to be controlled by an operator seated atop seat 188 directly behind the repositioned control handle 56, so that the operator may comfortably operate the mower from a 'driving' position, as opposed to a walk or ride behind position. Since seat fixture 190 is mounted at a rear portion of the floor unit 140, the operator now sits comfortably above the motor and cutting deck, with his legs resting atop the cutting deck.

Because floor unit 140 is pivotally attached to the front end of support frame 12, it can be tilted upwardly above the cutting deck, as shown by arrow 25 in FIG.

3, thereby exposing the top of the cutting deck and the underside of the support frame, and affording access to mechanical and electrical linkage that runs beneath floor plate 142.

As will be appreciated from the foregoing description, the cutting deck-mounted transformer unit of the present invention enables a conventional walk behind, mid-size rotary mower to be readily converted into a riding mower, such that the operator is able to comfortably control the mower from a sitting position above the cutting deck, similar to the case of a large capacity mower, and with his arms and hands placed directly in front of him on the relocated original control handle. Not only is operator fatigue reduced, but with the elimination of a sulky, the mower can now snugly maneuver around tight curves, in a manner akin to a 'zero turning radius' mower that is driven by a hydrostatic control drive system.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

By a separate Appendix, photographs of a conventional mid-size, walk behind, rotary mower and such a mower fitted with the transformer unit of the present invention have been submitted. Page 1 of the Appendix contains a photograph of a conventional mower, effectively corresponding to the diagrammatic illustrations of FIGS. 1 and 2, while pages 2-8 of the Appendix contain photographs of such a mid-size, walk behind, rotary mower fitted with the transformer unit described above and diagrammatically illustrated in FIGS. 3-10.

What is claimed is:

1. For use with a rotary mower having a front end supported by way of a pair of support wheels and a rear end supported by a pair of drive wheels, said drive wheels being coupled to a drive unit mounted at the rear end of said mower, a cutting deck supported between the front and rear ends of said mower, and an operator control handle having one or more control elements, which are coupled through linkage to a drive unit for said mower and through manipulation of which the operation of said mower is controlled, said operator control handle being mounted to a control handle attachment fixture at the rear end of said mower, such that the control handle normally extends rearwardly of said rear end of said mower, so as to be operated by a mower operator from behind the rear end of said mower, a transformer unit for enabling an operator to be situated above said cutting deck and control the operation of the mower therefrom comprising:

a support frame mountable to said mower atop said cutting deck and having an auxiliary operator control handle attachment fixture mounted thereto adjacent to said front end of said mower and being configured to engage and support said operator control handle such that, as repositioned to said auxiliary operator control handle attachment fixture, the repositioned control handle extends rearwardly of said auxiliary operator control handle attachment fixture to a position above said cutting deck adjacent to where an operator is to be situated; and an auxiliary control linkage arrangement for linking said one or more control elements of said repositioned operator control handle with said drive unit.

2. A transformer unit according to claim 1, further comprising a seat fixture mounted to said support frame and supporting an operator seat at a location elevated with respect to said cutting deck, thereby enabling an operator to be seated on said mower for controlling therefrom said repositioned operator control handle.

3. A transformer unit according to claim 2, wherein said seat fixture is mounted to a rear portion of said support frame and is configured to support an operator seat above said drive unit while permitting the legs of an operator, when the operator is sitting on said seat, to rest comfortable on said support frame atop said cutting deck.

4. A transformer unit according to claim 1, wherein said support frame includes a floor unit to which said auxiliary operator control handle attachment fixture is mounted, said floor unit being pivotable at said front end of said mower, so as to permit said floor unit to be pivotally raised above said cutting deck and thereby afford access to said cutting deck and the underside of said floor unit.

5. A transformer unit according to claim 1, wherein said mower has a cutting deck support structure to which said cutting deck is supported, and wherein said support frame comprises a frame member mountable to said cutting deck support structure and a floor unit pivotally attached to said frame member at the front end of said mower, so as to permit said floor unit to be pivotally raised above said cutting deck and thereby afford access to said cutting deck and the underside of said floor unit.

6. A transformer unit according to claim 5, wherein said support frame is configured to accommodate the attachment of a bag support fixture.

7. A transformer unit according to claim 1, wherein said operator control handle attachment fixture comprises a first bracket mounted to a rear end of said mower, said first bracket having a first plurality of operator control handle attachment locations whereat said operator control handle is attached to said first bracket, and control linkage elements rotationally mounted to said first bracket and engageable with control linkage elements of said handle, and wherein said auxiliary operator control handle attachment fixture comprises a second bracket mounted to a front end of said support frame, said second bracket having a second plurality of operator control handle attachment locations whereat said operator control handle is attachable to said second bracket, said second plurality of operator control handle attachment locations being arranged on said second bracket in conformity with the attachment locations of said first bracket.

8. A transformer unit according to claim 7, wherein said mower has a cutting deck support structure to which said cutting deck is supported, and wherein said support frame comprises a frame member mountable to said cutting deck support structure and a floor unit pivotally attached to said frame member at the front end of said mower, so as to permit said floor unit to be pivotally raised above said cutting deck and thereby afford access to said cutting deck and the underside of said floor unit.

9. A transformer unit according to claim 8, wherein said drive unit includes a transmission control mechanism mounted by way of a plurality of first mounting locations to said mower, and wherein said floor unit has a plurality of second mounting locations conforming with those of said plurality of first mounting locations to which said transmission control mechanism is mountable.

10. A transformer unit according to claim 1, further comprising an auxiliary set of control links supported by said support frame, and interconnectable between said repositioned operator control handle and drive unit.

11. In a walk behind, mid-size rotary mower having a front end supported by way of a pair of support wheels and a rear end supported by a pair of drive wheels, said drive wheels being coupled to a drive unit mounted at the rear end of said mower, a cutting deck supported between the front and rear ends of said rotary mower, and an operator control handle having one or more control elements, which are coupled through linkage to said drive unit and through manipulation of which the operation of said mower is controlled, said operator control handle being mounted to a control handle attachment fixture at the rear end of said mower, so as to be operated by a mower operator from behind the rear end of said mower, the improvement comprising a transformer unit for enabling an operator to be situated above said cutting deck and control the operation of the mower therefrom, said transformer unit including a support frame mountable to said mower atop said cutting deck and having an auxiliary operator control handle attachment fixture mounted thereto adjacent to said front end of said mower and being configured to engage and support said operator control handle such that, as repositioned to said auxiliary operator control handle attachment fixture, the repositioned operator control handle extends rearwardly of said auxiliary operator control handle attachment fixture to a position above said cutting deck adjacent to where an operator is to be situated, and an auxiliary control linkage arrangement which couples said one or more control elements of said repositioned operator control handle with said drive unit.

12. The improvement according to claim 11, further comprising a seat fixture mounted to said support frame and supporting an operator seat at a location elevated with respect to said cutting deck, thereby enabling an operator to be seated on said mower for controlling the operation of said mower by way of said repositioned operator control handle.

13. The improvement according to claim 12, wherein said seat fixture is mounted to a rear portion of said support frame and is configured to support an operator seat above said drive unit while permitting the legs of an operator, when the operator is sitting on said seat, to rest comfortably on said support frame atop said cutting deck.

14. The improvement according to claim 11, wherein said support frame includes a floor unit to which said auxiliary operator control handle attachment fixture is mounted, said floor unit being pivotable at said front end of said mower, so as to permit said floor unit to be pivotally raised above said cutting deck and thereby afford access to said cutting deck and the underside of said floor unit.

15. The improvement according to claim 14, wherein said mower has a cutting deck support structure to which said cutting deck is supported, and wherein said support frame comprises a frame member mountable to said cutting deck support structure and a floor unit pivotally attached to said frame member at the front end of said mower, so as to permit said floor unit to be pivotally raised above said cutting deck and thereby afford access to said cutting deck and the underside of said floor unit.

16. The improvement according to claim 15, wherein said support frame is configured to accommodate the insertion and attachment of a bag support fixture.

17. The improvement according to claim 11, wherein said operator control handle attachment fixture comprises a first bracket mounted to a rear end of said mower, said first bracket having a first plurality of operator control handle attachment locations whereat said operator control handle is attached to said first bracket, and control linkage elements rotationally mounted to said first bracket and engageable with control linkage elements of said operator control handle, and wherein said auxiliary operator control handle attachment fixture comprises a second bracket mounted to a front end of said support frame, said second bracket having a second plurality of operator control handle attachment locations whereat said operator control handle is attachable to said second bracket, said second plurality of operator control handle attachment locations being arranged on said second bracket in conformity with the attachment locations of said first bracket.

18. The improvement according to claim 17, wherein said mower has a cutting deck support structure to which said cutting deck is supported, and wherein said support frame comprises a frame member mountable to said cutting deck support structure, and a floor unit pivotally attached to said frame member at the front end of said mower, so as to permit said floor unit to be pivotally raised above said cutting deck and thereby afford access to said cutting deck and the underside of said floor unit.

19. The improvement according to claim 18, wherein said drive unit includes a transmission control mechanism mounted by way of a plurality of first mounting locations to said mower, and wherein said floor unit has a plurality of second mounting locations conforming with those of said plurality of first mounting locations to which said transmission control mechanism is mountable.

20. The improvement according to claim 11, further comprising an auxiliary set of control links supported by said support frame, and interconnectable between said repositioned operator control handle and drive unit.

21. A method of converting a mid-size, walk or ride-behind rotary mower into a riding mower configuration, such that a mower operator is able to control the operation of the mower from atop its cutting deck, said mower having a front end supported by way of a pair of support wheels and a rear end supported by a pair of drive wheels, said drive wheels being coupled to a drive unit mounted at the rear end of said mower, the mower's cutting deck being supported between front and rear ends thereof, and an operator control handle having one or more control elements, which are coupled through linkage to said drive unit and through manipulation of which the operation of said mower is controlled, said operator control handle being mounted to a control handle attachment fixture at the rear end of said mower, such that the operator control handle normally extends rearwardly of said rear end of said mower, so as to be operated, in its normal walk or ride-behind mode, by said mower operator from behind the rear end of said mower, comprising the steps of:
- (a) providing a support frame having an auxiliary operator control handle attachment fixture mounted thereto, said auxiliary operator control handle attachment fixture being configured to engage and support said operator control handle such that said operator control handle, when repositioned by attachment to said auxiliary operator control handle attachment fixture, extends rearwardly of said auxiliary operator control handle attachment fixture, said support frame further including an auxiliary control linkage arrangement operative to link one or more control elements of said repositioned operator control handle with the drive unit of said mower;
- (b) mounting said support frame atop the cutting deck of said mower, and repositioning said operator control handle by attaching said operator control handle to said auxiliary operator control handle attachment fixture such that the repositioned operator control handle expands rearwardly of said auxiliary operator control handle attachment fixture to a position above said cutting deck adjacent to where an operator is to be situated; and
- (c) providing an operative communication between the one or more control elements of said auxiliary control linkage arrangement with the drive unit of said mower.

22. A method according to claim 21, wherein step (a) comprises mounting a seat fixture to said support frame such that it will provide a seat for a mower operator at a location elevated with respect to said cutting deck, thereby enabling an operator to be seated on said mower while controlling the operation of said mower by manipulation of said repositioned operator control handle.

23. A method according to claim 22, wherein step (a) comprises mounting said seat fixture to a rear portion of said support frame, so as to seat said mower operator above said drive unit while permitting the legs of said mower operator, when said mower operator is sitting on said seat, to rest comfortably on said support frame atop said cutting deck.

24. A method according to claim 21, wherein said support frame includes a floor unit to which said auxiliary operator control handle attachment fixture is mounted in step (b), said floor unit being pivotable at said front end of said mower, so as to permit said floor unit to be pivotally raised above said cutting deck and thereby afford access to said cutting deck and the underside of said floor unit.

25. A method according to claim 21, wherein said mower has a cutting deck support structure to which said cutting deck is supported, and wherein said support frame comprises a frame member and a floor unit pivotally attached to said frame member adjacent to the front end thereof, and wherein step (b) comprises mounting said frame member to the cutting deck support structure of said mower, such that said floor unit may be pivotally raised above said cutting deck and thereby afford access to said cutting deck and the underside of said floor unit.

26. A method according to claim 21, wherein said operator control handle attachment fixture comprises a first bracket mounted to a rear end of said mower, said first bracket having a first plurality of operator control handle attachment locations whereat said operator control handle is attached to said first bracket, and control linkage elements rotationally mounted to said first bracket and engageable with control linkage elements of said operator control handle, and wherein said auxiliary operator control handle attachment fixture comprises a second bracket mounted to a front end of said support frame, said second bracket having a second plurality of operator control handle attachment locations to which said repositioned operator control handle is attached in step (b), said second plurality of operator control handle attachment locations being arranged on said second bracket in conformity with the attachment locations of said first bracket.

27. A method according to claim 26, wherein said drive unit includes a transmission control mechanism mounted by way of a plurality of first mounting locations to said mower, and wherein step (a) comprises providing said floor unit with a plurality of second mounting locations conforming with those of said plurality of first mounting locations, and step (b) comprises mounting said transmission control mechanism to said floor unit.

* * * * *